United States Patent
Leyh et al.

(10) Patent No.: US 9,831,964 B2
(45) Date of Patent: Nov. 28, 2017

(54) METHOD AND SYSTEM FOR IMPROVING ADJACENT CHANNEL REJECTION PERFORMANCE IN A WIRELESS NETWORK

(71) Applicant: MOTOROLA SOLUTIONS, INC., Schaumburg, IL (US)

(72) Inventors: Arthur Christopher Leyh, Spring Grove, IL (US); Gregory J. Buchwald, Crystal Lake, IL (US); David P. Gurney, Carpentersville, IL (US); Frank D. Panzica, Wilmette, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 91 days.

(21) Appl. No.: 14/733,673

(22) Filed: Jun. 8, 2015

(65) Prior Publication Data
US 2016/0360530 A1    Dec. 8, 2016

(51) Int. Cl.
*H04W 72/04* (2009.01)
*H04B 17/318* (2015.01)
*H04W 16/14* (2009.01)

(52) U.S. Cl.
CPC .......... *H04B 17/318* (2015.01); *H04W 16/14* (2013.01)

(58) Field of Classification Search
CPC ........... H04W 72/0453; H04W 72/082; H04W 16/14; H04B 17/318; H04J 11/0023
USPC ..... 370/327, 336; 455/114.2, 296, 450, 522, 455/62
See application file for complete search history.

(56) References Cited

U.S. PATENT DOCUMENTS

| | | | |
|---|---|---|---|
| 6,084,919 A | 7/2000 | Kleider et al. | |
| 7,693,501 B2 | 4/2010 | Cowley et al. | |
| 2004/0152434 A1* | 8/2004 | Peterson, III | H03J 1/0075 455/196.1 |
| 2004/0203393 A1* | 10/2004 | Chen | H04B 7/18536 455/63.1 |
| 2012/0135777 A1* | 5/2012 | Karpoor | H04W 52/40 455/522 |
| 2015/0139073 A1 | 5/2015 | Buchwald et al. | |
| 2015/0181546 A1* | 6/2015 | Freda | H04W 56/0015 370/336 |
| 2015/0189518 A1* | 7/2015 | Faerber | H04W 24/02 455/450 |

(Continued)

FOREIGN PATENT DOCUMENTS

JP       63180229       7/1988

*Primary Examiner* — Charles C Jiang
*Assistant Examiner* — Wali Butt
(74) *Attorney, Agent, or Firm* — Michael Best & Friedrich LLP

(57) ABSTRACT

Methods and systems for improving adjacent channel rejection performance in a wireless signal by a radio device in a mobile network. In one embodiment, a mobile radio network includes a first radio device (e.g., a subscriber), a second radio device, and a fixed radio apparatus (e.g., a base station or repeater). The first radio device receives a first channel signal having a first frequency offset with respect to a reference frequency. The first channel signal is associated with the second radio device. The first radio device measures the first frequency offset, determines a second frequency offset for a second channel signal, and transmits the second channel signal with the second frequency offset.

16 Claims, 7 Drawing Sheets

(56) References Cited

U.S. PATENT DOCUMENTS

2015/0257016 A1* 9/2015 Dural ................... H04W 24/02
                                                        370/252
2016/0262092 A1* 9/2016 Lee ....................... H04W 48/16

* cited by examiner

METHOD AND SYSTEM FOR IMPROVING ADJACENT CHANNEL REJECTION PERFORMANCE IN A WIRELESS NETWORK

BACKGROUND OF THE INVENTION

The available spectrum for two-way radio systems is limited in today's regulatory environment. Spectrum re-allocations, re-banding and re-purposing are becoming much more common in several radio frequency (RF) bands. Cellular carrier spectrum use (due to the smartphone revolution) is consuming especially large quantities of spectrum, leaving relatively less spectrum available for two-way radio uses. It is believed that this squeeze on available land mobile radio (LMR) spectral resources and spectrum use will continue to increase in the future, and will challenge two-way radio users.

Accordingly, there is a need for new and useful methods and systems for improving adjacent channel rejection performance in a wireless network, such as a land mobile radio network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
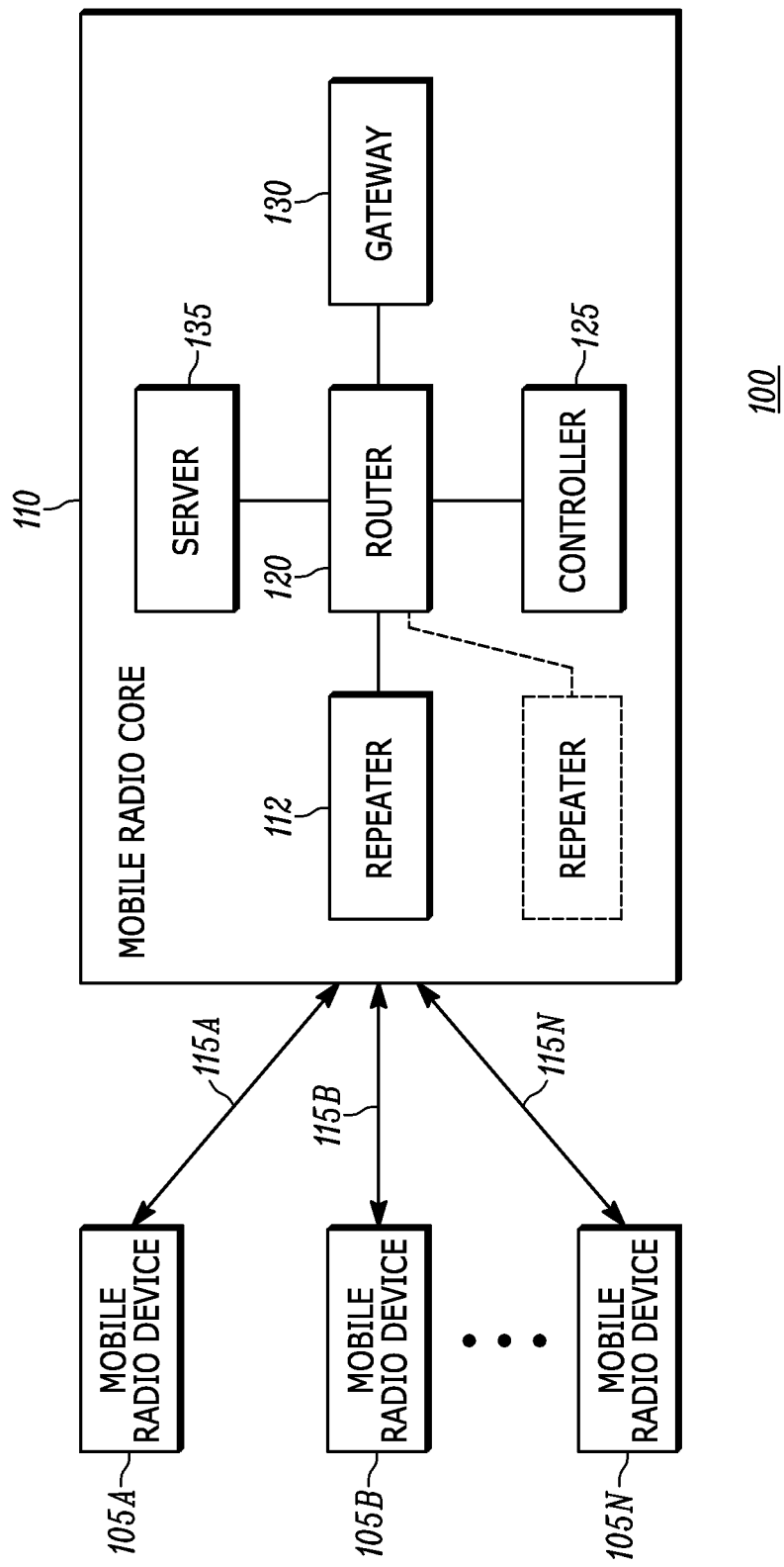
FIG. 1 is a block diagram of a land mobile radio system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

New approaches to make more spectrum available to land mobile radio users are needed. Techniques for improving spectral efficiency of two-way radio channels are extremely valuable in the eyes of both regulators and customers. Significant pressure is being placed on land mobile radio manufacturers by the regulators to improve spectrum utilization levels, or risk losing the spectrum to other service providers. By increasing land mobile radio system spectrum efficiency, land mobile radio manufacturers can help to maintain existing land mobile radio spectrum allocations. Furthermore, increased spectrum efficiency also helps to improve both voice capacity and effective throughput (e.g., data transfer rates) in land mobile radio systems. Improving data transfer rates also help to provide moderate rate data services in areas where broadband access is unavailable and extend markets for land mobile radio equipment.

One embodiment takes the form of a method of improving adjacent channel rejection performance in a wireless signal by a first radio device, which can be a first mobile radio device, in a mobile radio network. The mobile radio network further includes a second radio device, which can be a second mobile radio device, and a fixed radio apparatus. The method is performed by the first radio device. The method includes receiving a first channel signal having a first frequency offset with respect to a reference frequency. The first channel signal is associated with the second radio device. The method further includes measuring the first frequency offset, and determining a second frequency offset for a second channel signal. The second frequency offset is determined with respect to the reference frequency and the determination is based on the measured first frequency offset. The method also includes transmitting the second channel signal with the second frequency offset. Determining the second frequency offset can include comparing the magnitude of the first frequency offset to a first threshold, and if the first frequency offset is less than the first threshold, increasing the magnitude of the second frequency offset by an additional offset.

In some implementations, the first channel signal is a signal selected from the group consisting of an uplink signal from the second radio device to a second fixed radio apparatus and a downlink signal from the second fixed radio apparatus to the second radio device.

In some embodiments, the method further includes determining a received signal strength related to a signal from the fixed radio apparatus. Determining a magnitude of the second frequency offset is further based on the determined received signal strength. Determining the received signal strength can include estimating an uplink received signal strength at the fixed radio apparatus for the second channel signal to be transmitted to the fixed radio apparatus from the first radio device. Estimating the uplink received signal strength might include measuring a downlink received signal strength of the signal from the fixed radio apparatus and modifying the downlink received signal strength to estimate the received signal strength.

In some embodiments the method further includes the first channel signal residing in a first sub-channel of a shared radio channel, and the second channel signal residing in a second sub-channel of the shared radio channel. The reference signal can be a center frequency of the shared radio channel, and the shared radio channel can be a 25 kilohertz wide frequency channel.

Another embodiment takes the form of a radio device that includes a radio unit, a processor, and a memory that has instructions executable by the processor for causing the radio device to perform the just-recited operations relating to the radio device.

Yet another embodiment takes the form of a second method for improving adjacent channel rejection performance for a wireless signal in a mobile radio network. The mobile radio network includes a fixed radio apparatus and a radio device, The second method is performed by the fixed radio apparatus. The method includes receiving a first channel signal having a first frequency offset with respect to a reference frequency. The first (e.g. uplink) channel signal is associated with the radio device and can reside in a first sub-channel of a shared radio channel. The method also includes determining a second frequency offset with respect to the reference frequency. The magnitude of the second frequency offset is based on a magnitude of the first frequency offset. The method further includes transmitting a second (e.g., downlink) channel signal with the second frequency offset.

In some embodiments, the method includes the stationary radio apparatus determining the second frequency offset by comparing the magnitude of the determined frequency offset to a first threshold, and if the determined offset is greater than the first threshold, modifying the second transmitter frequency offset.

In another embodiment, the invention takes the form of a fixed radio apparatus having a radio unit, a processor, and a memory that has instructions executable by the processor for causing the fixed radio apparatus to perform the just-recited actions by the fixed radio apparatus.

FIG. 1 illustrates a block diagram of a land mobile radio system 100. FIG. 1 shows a plurality of mobile radio devices 105A, 105B, . . . 105N in communication with a mobile radio core 110 via a plurality of wireless communication links 115A, 115B, . . . 115N. Each mobile radio device 105A, 105B, . . . 105N is shown in FIG. 1 as having a respective wireless communication link 115A, 115B, . . . 115N for communication with the mobile radio core 110. A communication link, e.g. communication link 115A, may take the form of a channel, may be within a single channel having multiple communication sub-channels, or may encompass multiple channels. More detailed examples relating to communication links 115A, 115B, . . . 115N will be discussed further below. For example, a first mobile radio device 105A may communicate with a second mobile radio device 105B via the mobile radio core 110, e.g., via a repeater of the mobile radio core 110. Under this scenario what is shown as wireless communication links 115A and 115B may be part of a single channel. It is also envisioned that the channel from the first mobile radio device 105A to the second mobile radio device 105B can be through wired portions of the land mobile radio system 100, e.g., as part of or connected to mobile radio core 110.

Figure 2:
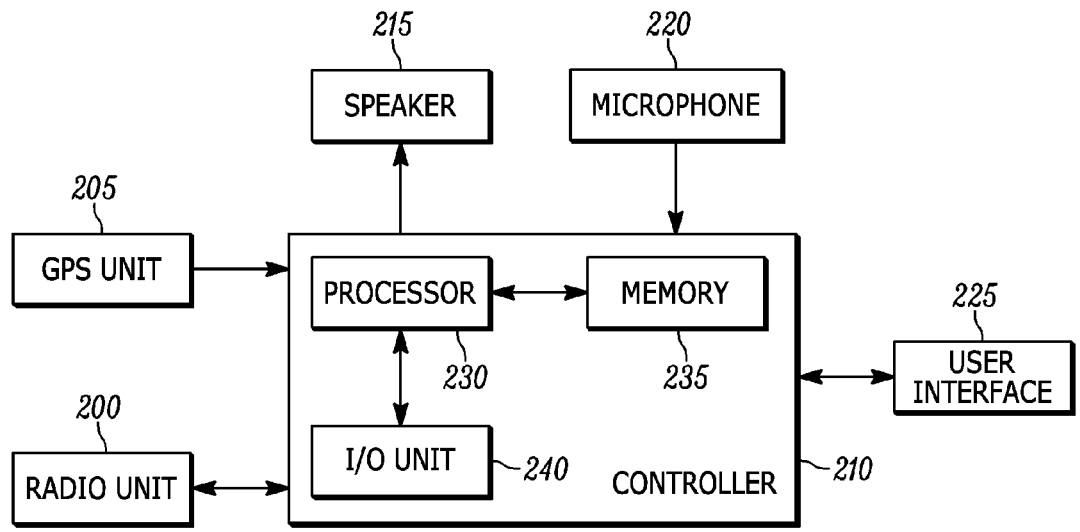
FIG. 2 is a block diagram of a mobile radio device capable of operating in the system of FIG. 1.

FIG. 2 is a block diagram of the mobile radio device 105A. The mobile radio device 105A includes, among other components, a radio unit 200, a global positioning system (GPS) unit 205, a controller 210, a speaker 215, a microphone 220, and a user interface 225. The mobile radio device 105A may further include other elements commonly associated with mobile radio devices (e.g., one or more sensors, a vibrator, etc.). Some mobile radio devices may not include global positioning system or audio interfaces (e.g., a data-only radio). Moreover, while the term mobile is used in connection with the mobile radio device 105A, the radio device may be stationary for a substantial period of time. Also the mobile radio devices 105B . . . 105N may be arranged and operate similar to the mobile radio device 105A shown in FIG. 2.

In one exemplary construction, the controller 210 includes, among other components, a processor 230, a memory 235, and an input/output unit 240. The memory 235 includes operational data for use by the processor 230 and program instructions for execution by the processor 230. The executed instructions enable the controller 210 to, among other things, interface to the global positioning system unit 205 to receive global positioning data, control the radio unit 200 to communicate with the mobile radio core 110, interact with the speaker 215, microphone 220, and user interface 225 to interact externally with an operator (e.g., a technician) or another machine (e.g., a computer or other electronic device), and control other functionality associated with the mobile radio device 105A. It will be appreciated by one of ordinary skill in the art that some functions can be added or removed depending on the design and type of the mobile radio device 105A. The controller 210 also includes an input/output (I/O) unit 240 that includes routines for transferring information between components within the controller 210 and other components of the mobile radio device 105A.

Software included in the implementation of the mobile radio device 105A is stored in the memory 235 of the controller 210. The software includes, for example, firmware, one or more applications, program data, one or more program modules, and other executable instructions. The controller 210 is configured to retrieve from memory and execute, among other things, instructions related to the control processes and methods described herein.

The radio unit 200 includes, among other components, an antenna, a receiver, a transmitter, a modulator, and a demodulator. The receiver and transmitter may be separate units or part of a transceiver that both receives and transmits communication signals. The modulator and demodulator may be separate units or part of a modem that both modulates and demodulates data. The antenna, receiver, transmitter, modulator, and demodulator enable the controller 210 to send and receive communication to and from the mobile radio core 110 via a direct mode of operation.

The global position system unit 205 includes, among other components, an antenna and a receiver. The antenna and receiver enable the controller 210 to receive global positioning data from a global positioning system during operation. The antenna and receiver for the global positioning system unit 205 may use the same antenna and receiver as the radio unit 200, or be different from the antenna and receiver of the radio unit 200.

The user interface 225, if present, controls the operation of the mobile radio device 105A. The user interface 225 is operably coupled to the controller 210 to allow an operator to interact with the mobile radio device 105A. The user interface 225 can include a combination of digital and analog input devices required to achieve a desired level of control for the mobile radio device 105A. For example, the user interface 225 can include one or more of: a display (e.g., liquid-crystal-display screen, light-emitting diode screen, etc.); a touch-screen display; and a plurality of knobs, dials, switches, buttons, faders, or the like. The speaker 215 and microphone 220 allow the operator to audibly interact with the mobile radio device 105A.

Referring back to FIG. 1, the mobile radio core 110 is shown as including a repeater 112, a router 120, a controller 125, a gateway 130, and a server 135, all of which are generally conventional elements (except as further discussed herein) of a mobile radio core 110. It will be appreciated by one of ordinary skill in the art that the mobile radio core 110 may include a plurality of one or more elements shown in FIG. 1 (e.g., may include a plurality or repeaters 112 connected to the router 120), may include other elements (e.g., a console) normally associated with a mobile radio core 110, and may not include all of the elements 112, 120, 125, 130, and 135 shown. Also, an element (e.g., the server 135) shown as being part of the mobile radio core 110 may be located outside of the mobile radio core 110. The mobile radio core 110 can be for commercial and/or public safety use.

Figure 3:
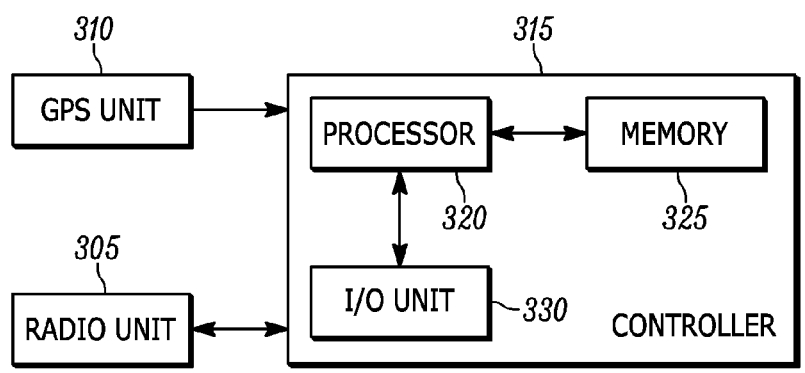
FIG. 3 is a block diagram of a fixed radio apparatus capable of operating in the mobile radio core of FIG. 1.

FIG. 3 is a block diagram of a fixed radio apparatus 300 of the mobile radio core 110. The fixed radio apparatus 300 may be part of the repeater 112, for example. The fixed radio apparatus 300 shown in FIG. 3 promotes wireless communication with one or more of the mobile radio devices 105A, 105B, . . . 105N. The fixed radio apparatus 300 includes a radio unit 305, an optional global positioning system (GPS) unit 310, and a controller 315. The fixed radio apparatus 300 may be located within a single apparatus (e.g., the repeater 112) of the mobile radio core 110, or distributed among multiple apparatus of the mobile radio core 110.

In the construction shown in FIG. 3, the controller 315 provides operational control to the fixed radio apparatus 300. In some constructions, the controller 315 includes, for example, a processor 320 connected to a memory 325. The memory 325 includes operational data for use by the processor 320 and program instructions for execution by the processor 320. The controller 315 also includes an input/output (I/O) unit 330 that includes routines for transferring information between components within the controller 315 and other components of the fixed radio apparatus 300.

Software included in the implementation of the fixed radio apparatus 300 is stored in the memory 325 of the controller 315. The software includes, for example, firmware, one or more applications, program data, one or more program modules, and other executable instructions. The controller 315 is configured to retrieve from memory and execute, among other things, instructions related to the control processes and methods described herein. Executed instructions enable the controller 315 to, among other things, interface to the global positioning system unit 310 to receive global positioning data, control the radio unit 305 to communicate with the mobile radio devices 105A, 105B, . . . 105N, and control other functionality associated with the fixed radio apparatus 300.

Techniques for improving the capacity of the land mobile radio system 100 are described below. In such a land mobile radio system, a challenge arises for controlling adjacent channel interference levels. System interference performance can be optimized by using tightly controlled induced channel frequency offsets to greatly reduce adjacent channel interference concerns in these systems.

In some prior systems, a mobile radio device 105A, which may be referred to as a subscriber, autonomously determines that an added offset mitigates adjacent channel interference that can result if the adjacent channel signal is reaching a fixed radio apparatus 300, which may be referred to as a base station or repeater, at a low signal level. A mobile radio device 105A that determines that it will reach the fixed radio apparatus 300 at a high level may also additionally offset its frequency to mitigate the effects of adjacent channel interference. What has not been addressed is a method to notify the mobile radio device 105B on the affected adjacent channel. Through this notification, even though the mobile radio device 105B on the adjacent channel may not have reached the threshold whereby it would additionally offset itself autonomously (in the opposite direction of the strong adjacent signal), the mobile radio device 105B will know to do so by receiving the notification. By doing so, the mobile radio device 105B will increase its ability to overcome any near/far interference issues beyond the initial offset performed by the high power signal on the adjacent channel signal.

In certain spectrum allocations, there exists excessive guard bands within channels. These guard bands were especially needed prior to the use of modern high precision temperature-compensated oscillators, global positioning locked systems, or automatic frequency control training algorithms commonly used in subscriber units. Recently, adjacent channel power limitations are allowed to dictate the use of an assigned frequency; previously, channel bandwidths and inter-carrier spacing were limited by rules regulating the use of narrowband emissions. These new regulatory changes allow multiple independent carriers of certain modulation methods to occupy a single licensed channel without exceeding first adjacent channel emissions regulations and requirements.

For example, at 800 megahertz (MHz), channels are currently assigned on a 25 kilohertz (kHz) raster, or licensed channel, yet the radiated signal occupies only the central 7.6 kilohertz portion of the channel. As a consequence, relatively large guard bands are left around each carrier. Previously, these guard bands created a "slop zone" wherein the carrier could drift without moving out of channel and creating interference.

Today, the large slop zone is no longer necessary if a system is properly engineered. The frequency stability of land mobile radio units is much improved, and the adjacent channel rejection (ACR) performance of modern two-way digital radio systems is very good (typically in the range of 60-65 dB ACR, for example). This performance level can be maintained even for two signals within a single channel through the use of modern digital signal processing techniques.

Figure 4:
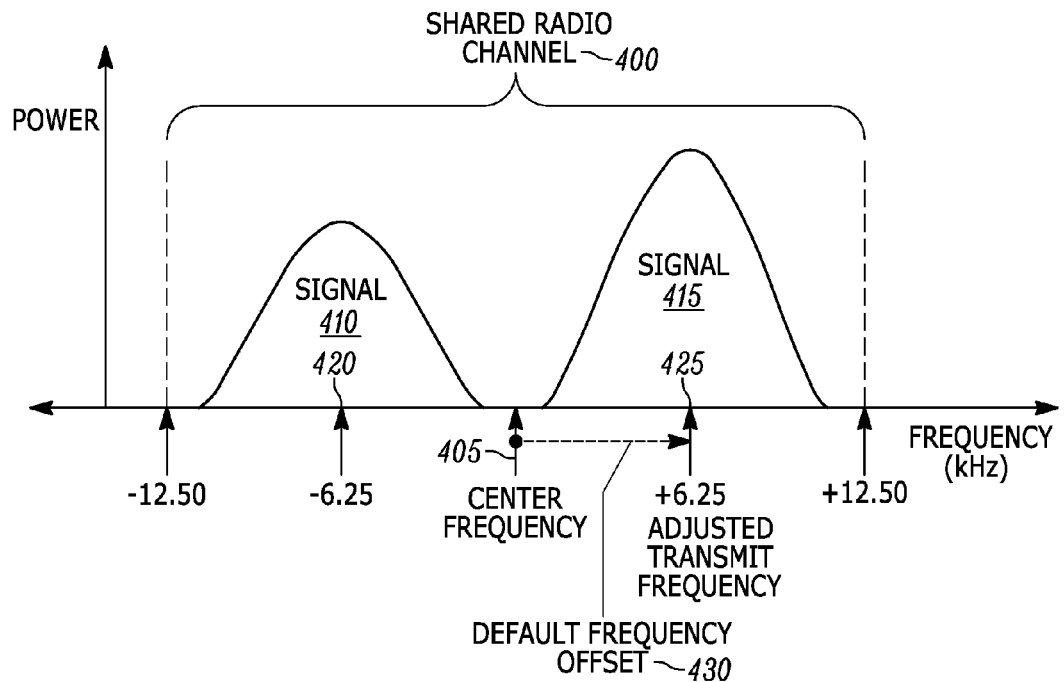
FIG. 4 is a representation of a shared radio channel in a first instance in accordance with some embodiments.

FIG. 4 depicts a representation of a shared radio channel 400 in a first instance, in accordance with at least one implementation. For FIG. 4 the shared radio channel 400 has a center frequency 405 and two distinct communication sub-channels. One sub-channel has a first signal 410. The other sub-channel has a second signal 415. Each sub-channel is an independent communication channel that carries unique information. Within the shared radio channel 400 the first sub-channel has a first center frequency 420 and the second sub-channel has a second center frequency 425. The first center frequency 420 and the second center frequency 425 have respective default frequency offsets (430 is shown) from the center frequency of the shared radio channel. For FIG. 4, the first and second frequency offsets 430 are the same and are set equidistant between the center frequency and the edge frequencies of the shared radio channel 400. Accordingly, FIG. 4 shows a single regulatory (or licensed) radio channel that carries two distinct signal transmissions in two sub-channels, thereby increasing spectral efficiency.

It will be appreciated by one of ordinary skill in the art that the various numbers (e.g., 25 kilohertz, −12.50 kilohertz, −6.25 kilohertz, +6.25 kilohertz, and +12.50 kilohertz) along the frequency (kHz) axis are not meant to represent absolute values of frequencies themselves, but rather represent examples of frequency offset relative to the center frequency 405. Also, the embodiments can be extended to neighboring channels with a common reference frequency.

Since the inbound/uplink mobile radio device transmissions are not co-located—they are typically widely distributed within a mobile or portable coverage area—large received signal dynamic ranges and adjacent channel interference may be present at the fixed radio apparatus 300. Signal levels may be received with up to roughly 80 dB difference, for example, at the fixed radio apparatus 300 input, due to near/far transmissions of varying power levels and channel effects. An exemplary receiver tolerance may be a 60-65 dB adjacent channel tolerance. Thus, additional steps can be taken to mitigate the potential adjacent channel interference effects that can result in the proposed capacity doubled system.

In one implementation, the fixed radio apparatus 300 transmits the two outbound/downlink packed carriers as nominally statically-assigned frequencies. In an another implementation, the fixed radio apparatus may consist of a first radio apparatus that transmits on a first channel, and a second radio apparatus that transmits on a second channel. These two (or more) radio apparatus are often co-sited (i.e., reside at the same or a similar location). Since the fixed radio apparatus 300 often is a high site, wide service area system, providing a uniform protection to the first adjacent allocation is prudent. Outbound/downlink channels often arrive at a mobile or portable receiver in the field at similar signal levels. This is naturally accomplished in the outbound/downlink since the transmitters for different mobile or portable devices are co-located, and undergo similar path loss effects to any given mobile or portable device. The mobile radio devices 105, on the other hand, usually operate under less ideal conditions with regard to inbound/uplink signal propagation conditions. Many handheld and mobile devices operate with a typical antenna height above ground level (AGL) of 1.5-2.0 meters, over wide ranging service areas. Although indoor devices can also operate at significantly higher antenna height above ground levels, they may have widely varying path losses due to unpredictable building penetration losses. In addition, some wireless communication devices operate at lower power levels than other wireless communication devices (e.g., a portable device vs. a mobile device). All of these factors lead to significant variability in received power levels at the base station receiver.

In one implementation, an adjacent sub-channel interference mitigation method first predicts whether adjacent channel interference may be an issue at the mobile radio core 110 if no modification occurs. For example, the average received signal strength indication (RSSI) level of the received downlink/base signal ($RSSI_{down}$) at the mobile device receiver (e.g., 105A) is utilized to roughly estimate the expected uplink received signal strength indication level ($RSSI_{up}$) at the base station. The received downlink/base signal that is utilized may be any signal that is transmitted by a base station (e.g., a voice or data signal for any mobile or portable device, a control channel, etc.). The downlink signal strength should essentially (and roughly) track the uplink level (minus any fading and differing frequency channel effects), so $RSSI_{down}$ is proportional to $RSSI_{up}$. A correction term (e.g., of $20 \log(F_{down}/F_{up})$) may be applied to the $RSSI_{down}$ measurement to account for the frequency difference between the inbound and outbound channels.

The general categorization of the estimated $RSSI_{up}$ level does not need to be very accurate to be useful in mitigating adjacent channel interference. If the $RSSI_{up}$ level exceeds a predetermined threshold (e.g., −58 dBm), it is anticipated that the mobile radio device's 105 received signal (at the base station input) will be strong, and the device 105 can add an additional offset to its transmitted uplink carrier frequency. If the channel utilized is that of the lower carrier frequency in the shared channel, an additional offset amount (e.g., of approximately 1.4 kHz) is subtracted from the transmitted carrier frequency. If, on the other hand, the upper carrier allocation in the shared channel allocation is utilized, an additional offset amount (e.g., of approximately 1.4 kHz) is added to the carrier frequency. This additional frequency offset separation provides additional adjacent channel isolation, due to the roll-off of the channel filtering in the base receiver.

For a more specific example, if the standard offset on uplink and downlink channels is +/−6.25 kHz (12.5 kHz total), the subscriber device may extend the dynamic carrier offset to 7.65 kHz or, perhaps, further. By doing so, the permitted uplink/downlink (U/D) ratio for first adjacent channel power can be increased substantially. In the case of one example, the uplink/downlink ratio is extended from approximately 60 dB to approximately 72 dB.

Figure 5:
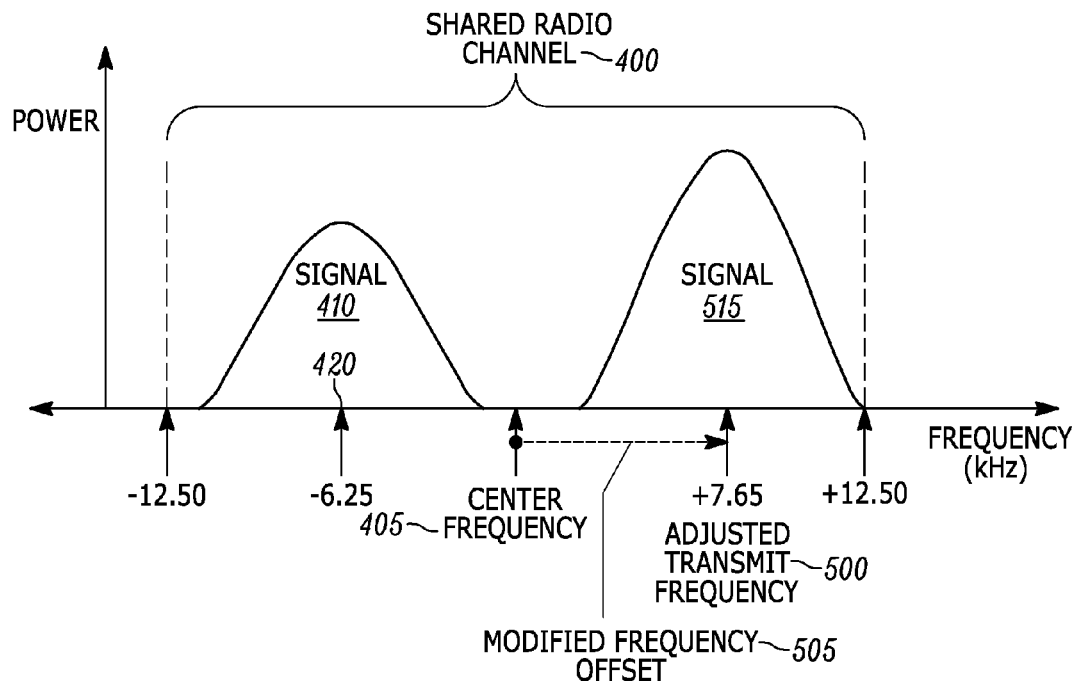
FIG. 5 is a representation of a shared radio channel in a second instance in accordance with some embodiments.

FIG. 5 depicts the shared radio channel 400 of FIG. 4 in a second instance, in accordance with at least one implementation. In particular, FIG. 5 depicts an example that occurs later in time than the example depicted in FIG. 4. FIG. 5 corresponds with the mobile radio device 105A that is transmitting or has transmitted the signal 415 (FIG. 4) having determined that the estimated expected $RSSI_{up}$ power level exceeds a threshold. The mobile radio device 105A has accordingly responsively set its adjusted transmit frequency 500 to be equal to the center frequency 405 plus a modified frequency offset 505. In the depicted example, the modified frequency offset is 7.65 kHz, which exceeds the example default frequency offset of 6.25 kHz by 1.4 kHz. The example offset values are exemplary. The result is that an adjusted transmit signal 515 that is based on the modified frequency offset is further from the center frequency 405 of the shared radio channel 400 than is an adjusted transmit signal that is based on the default frequency offset.

Figure 6:
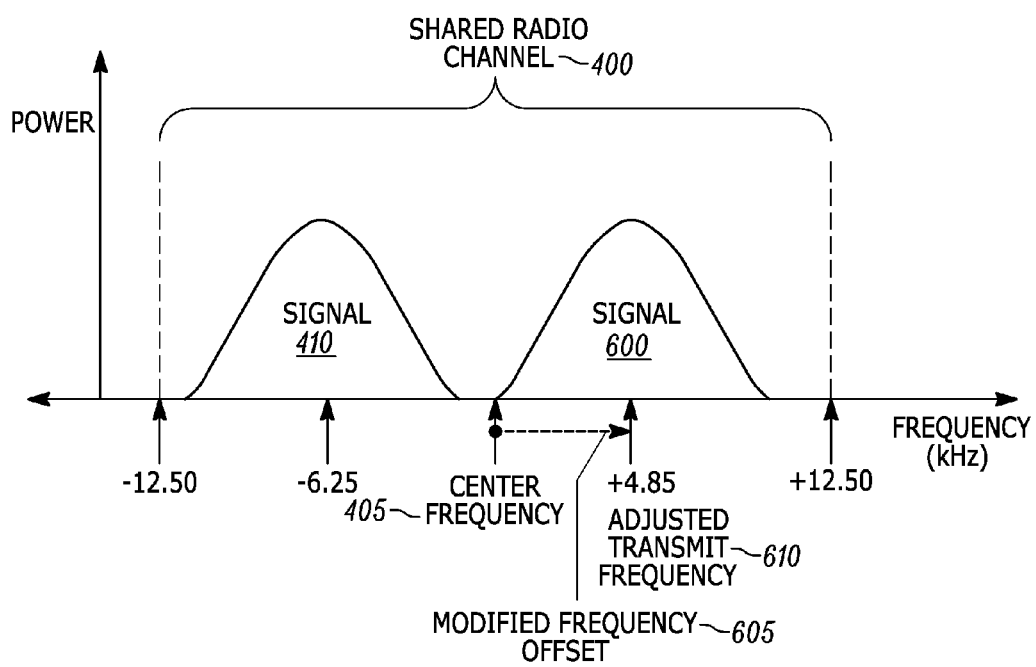
FIG. 6 is a representation of a shared radio channel in a third instance in accordance with some embodiments.

While the mobile radio device 105A located close to the fixed radio apparatus 300 has autonomously offset its inbound/uplink further away from the channel center of the shared channel (FIG. 5), the fixed radio apparatus 300 recognizes this shift and shifts the outbound transmit signal the opposite direction, i.e., closer to the channel center. For example, FIG. 6 depicts the shared radio channel 400 of FIG. 4 in a second subsequent instance in accordance with at least one implementation. In particular, FIG. 6 depicts an example that occurs later in time than the examples depicted in FIG. 5. FIG. 6 corresponds with the fixed radio apparatus 300 transmitting a signal 600 having determined that the adjusted transmit frequency 500 has changed, thereby indicating the $RSSI_{up}$ level for the fixed radio apparatus 300 exceeds the threshold. The mobile radio device 105A has accordingly responsively set its adjusted transmit frequency to be equal to the center frequency plus a modified frequency offset 505 (FIG. 5). Similarly, the fixed radio apparatus 300 may adjust its transmitted signal. In the depicted example, the modified frequency offset is 4.85 kHz, which is the example default frequency offset 6.25 kHz reduced by 1.4 kHz. The example offset values are exemplary. The result is that an adjusted transmit signal 600 (FIG. 6) that is based on the modified frequency offset 605 being closer to the center frequency 405 of the shared radio channel 400.

Figure 7:
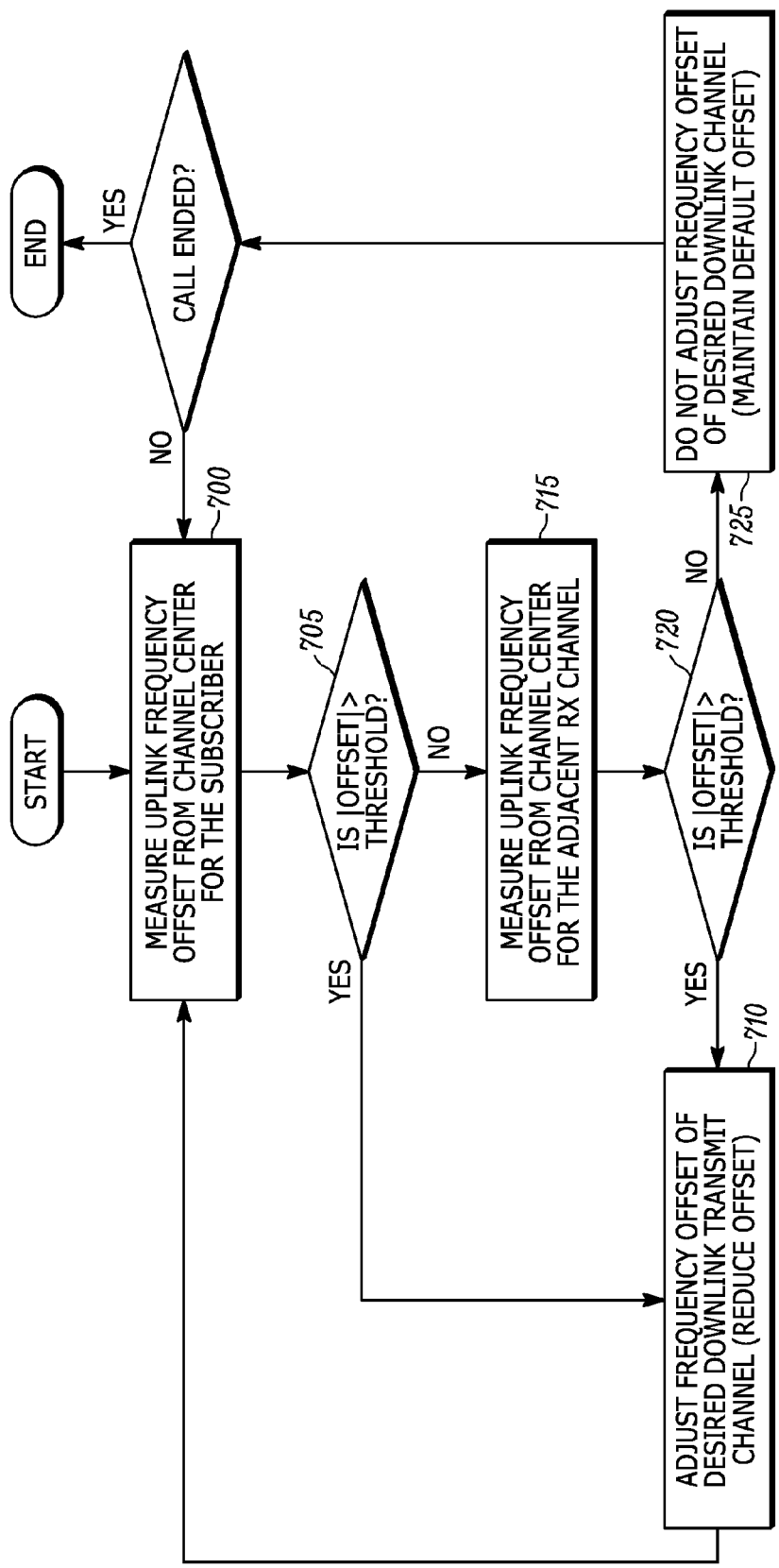
FIG. 7 is a flowchart of a process for improving adjacent channel rejection performance by the fixed radio apparatus of FIG. 3 in accordance with some embodiments.

FIG. 7 illustrates a flow chart of a method of improving adjacent channel rejection performance with the fixed radio apparatus 300 interacting with the mobile radio devices 105A. At block 700, the fixed radio apparatus 300 measures the uplink frequency (e.g., frequency 500 of FIG. 5) from channel center frequency 405 for the mobile radio device 105A. If the magnitude of the (inbound/uplink) frequency offset 505 is greater than a threshold (block 705), then the fixed radio apparatus 300 adjusts the frequency offset by reducing the magnitude of the (outbound/downlink) frequency offset (block 710) as shown in FIG. 6. This condition is referred to as a modified (outbound/downlink) frequency offset value. Otherwise at block 715, the fixed radio apparatus 300 measures the (inbound/uplink) frequency offset at block 715 of a neighboring channel, such as a channel associated with the mobile radio device 105B. At block 720, the fixed radio apparatus 300 determines whether the magnitude of the (inbound/uplink) frequency offset for the neighboring channel is greater than a threshold. If so, then the fixed radio apparatus 300 adjusts the frequency offset by reducing the magnitude of the (outbound/downlink) frequency offset (block 710) as shown in FIG. 6. Otherwise at block 725, the fixed radio apparatus 300 does not adjust the frequency offset of the downlink signal.

Figure 8:
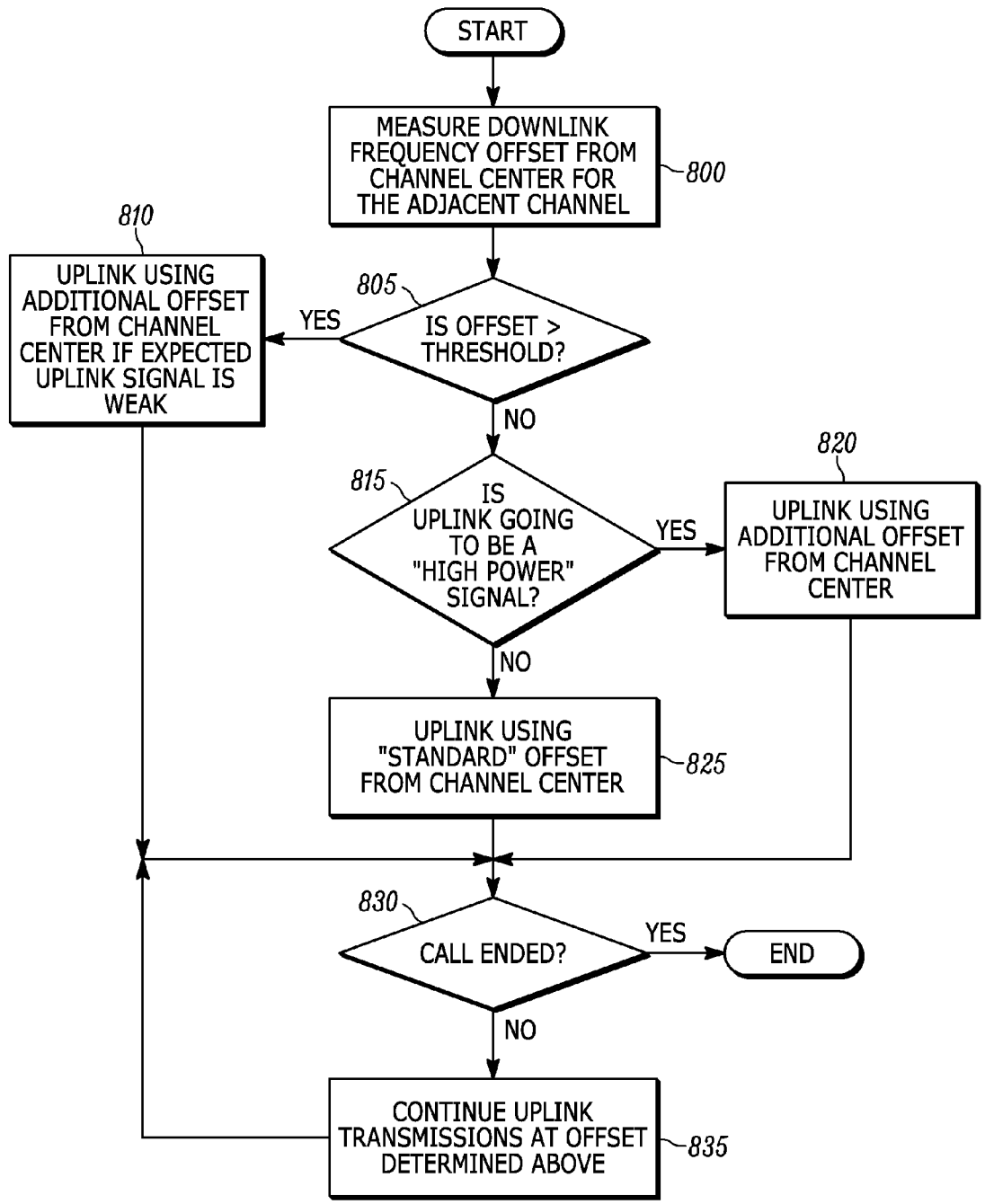
FIG. 8 is a flowchart of a process for improving adjacent channel rejection performance by the mobile radio device of FIG. 2 in accordance with some embodiments.

FIG. 8 provides a flow chart of improving adjacent channel rejection performance with the mobile radio device 105B transmitting the first (adjacent channel) signal 410 of FIG. 4. The mobile radio device 105B recognizes a characteristic on the adjacent sub-channel, such as through the modified frequency offsets 505 and 605. For example, through the use of a dual watch (dual) receiver, mobile radio device 105B recognizes that the downlink of the adjacent channel signal 515 has shifted (blocks 800 and 805 of FIG. 8, due to block 710 in FIG. 7). In response, mobile radio device 105B now has knowledge that there is a possibility of its uplink being interfered with by the near/far effect from mobile radio device 105A. As a result, if mobile radio device 105B starts a call, it will add, in some implementations, an additional frequency offset to its inbound/uplink signal (e.g., in the opposite direction) as shown by block 810 of FIG. 8. By doing so, the result is a doubling the frequency offset from the adjacent channel device's uplink.

Of course the serving fixed radio apparatus 300 can recognize the shift in the inbound/uplink frequency and may also shift in the opposite direction (to be consistent), as discussed above with FIG. 7. The end result is the downlink signals are actually closer together in frequency but, since they are co-located transmitters, adjacent channel interference on the outbound/downlink signals is not a concern. The uplink/downlink limits for a signal spaced at 12.5 KHz measures around 65 dB. If the spacing is only 10.5 kHz the uplink/downlink ratio drops to the low 50 dB range. Any differential fading over the relatively narrow bandwidths involved would be minimal and well below the 50 dB range, so there will be no problems with the mobile radio devices 105A and 105B in terms of adjacent channel interference. Before proceeding further, it should be understood that the mobile radio devices 105A and 105B may communicate with separate fixed radio apparatus 300 or the same fixed radio apparatus 300.

The additional offset for the second signal may be applied in some implementations only if the expected uplink signal at the fixed radio apparatus 300 is estimated or expected to be weak. The estimated uplink RSSI can be directly estimated based off of the downlink signal strength, as described above. Alternatively, the uplink for the second signal can be shifted (in the opposite direction) regardless of the estimated uplink RSSI at the base receiver.

Referring again to FIG. 8, the mobile radio device 105B determines whether its uplink is going to be a high power signal. This can be accomplished similar to what has already been discussed for signal 515 of FIG. 5. If the signal is going to be high powered, the mobile radio device 105B adds additional offset (block 820) from the center frequency 405. Otherwise, the mobile radio device 105B continues to use its standard offset from channel center (block 825).

In some implementations, as long as the call involving the mobile radio device 105B is ongoing (block 830), the subscribers in the call involving the adjacent channel of mobile radio device 105B stays shifted (block 835). While the call involving the mobile radio device 105A may end, the call with mobile radio device 105B continues to utilize the shifted uplink. If during the duration of the call of mobile radio device 105B, a subscriber (e.g., mobile radio device 105A) initiates a call it will have recognized the offset involving mobile radio device 105B and also shift its uplink accordingly. Once mobile radio devices 105A and 105B end their calls, the downlink from the fixed radio apparatus 300 will be reset to the nominal (non-modified) offset frequencies and await a new uplink.

The end result is the ability to notify the presence of the high power uplink subscriber on the adjacent channel without adding any overhead in terms of traditional signaling. Additionally, the added frequency shifts of the subscribers under prescribed conditions reduce the possibility of interference with neighboring adjacent channel users as typically subscribers at the fringe would not be autonomously offsetting their uplink.

Figure 9:
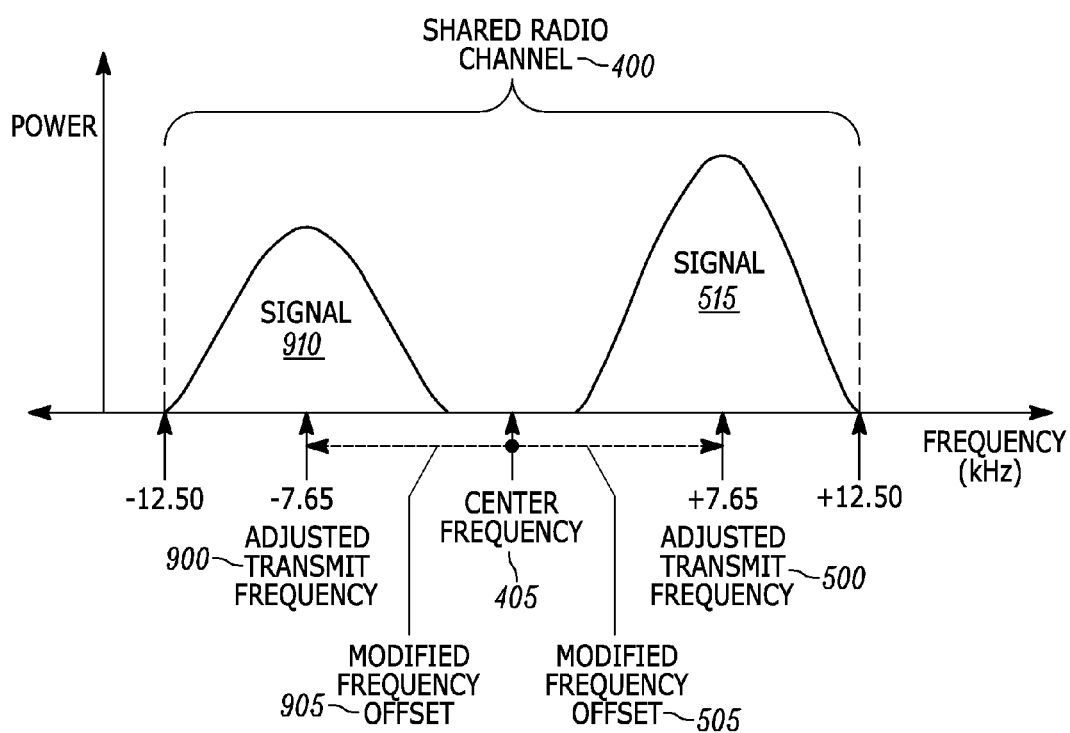
FIG. 9 is a representation of a shared radio channel in a fourth instance in accordance with some embodiments.

FIG. 9 depicts the shared channel of in a fourth subsequent instance, in accordance with at least one implementation. FIG. 9 corresponds with the mobile radio device 105B (that is transmitting or has transmitted the first signal 410) having determined that the adjusted transmit frequency of signal 515 (or signal 600) has changed, thereby indicating the power level for mobile radio device 105A exceeds the threshold. The mobile radio device 105B has accordingly responsively set its adjusted transmit frequency 900 to be equal to the center frequency 405 minus a modified frequency offset 905. In the depicted example, the modified frequency offset is 7.65 kHz, which increases the example default frequency offset of 6.25 kHz by 1.4 kHz. The example offset values are exemplary. The result is that an adjusted transmit signal 910 that is based on the modified frequency offset 905 is further from the center frequency 405 of the shared radio channel 400 than is an adjusted transmit channel that is based on the default frequency offset.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 25%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Further, embodiments described above are in connection with a land mobile radio system. However, it should be appreciated that embodiments can be used in other radio systems and not just a land mobile radio system.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of improving adjacent channel rejection performance in a wireless signal used by a first radio device in a mobile radio network, the mobile radio network including a second radio device and a fixed radio apparatus, the method being performed by the first radio device and comprising:
    receiving a first channel signal having a frequency that is offset from a reference frequency by a first frequency offset, the first channel signal associated with the second radio device;
    measuring the first frequency offset;
    determining a received signal strength related to a signal transmitted by the fixed radio apparatus;
    determining a second frequency offset, the second frequency offset being determined with respect to the reference frequency, the determination based on the measured first frequency offset and the received signal strength; and
    transmitting a second channel signal having a frequency that is offset from the reference frequency by the second frequency offset;
    wherein determining the received signal strength includes estimating an uplink received signal strength at the fixed radio apparatus for the second channel signal to be transmitted to the fixed radio apparatus from the first radio device.

2. The method of claim 1, wherein the first channel signal is a signal selected from the group consisting of an uplink signal from the second radio device to a second fixed radio apparatus and a downlink signal from the second fixed radio apparatus to the second radio device.

3. The method of claim 1, wherein estimating the uplink received signal strength includes measuring a downlink received signal strength of the transmitted signal from the fixed radio apparatus to the first radio device and modifying the downlink received signal strength to estimate the uplink received signal strength.

4. The method of claim 1, wherein the first channel signal resides in a first sub-channel of a shared radio channel, and the second channel signal resides in a second sub-channel of the shared radio channel.

5. The method of claim 4, wherein the reference frequency is a center frequency of the shared radio channel.

6. The method of claim 5, wherein the shared radio channel is a 25 kilohertz wide frequency channel.

7. The method of claim 1, wherein determining the second frequency offset includes comparing a magnitude of the first frequency offset to a first threshold, and if the magnitude of the first frequency offset is less than the first threshold, increasing a magnitude of the second frequency offset by an additional offset.

8. A method for improving adjacent channel rejection performance for a wireless signal in a mobile radio network, the mobile radio network including a fixed radio apparatus and a radio device, the method being performed by the fixed radio apparatus and comprising:
receiving a first channel signal having a frequency that is offset from a reference frequency by a first frequency offset, the first channel signal associated with the radio device;
determining a received signal strength related to a signal transmitted by the fixed radio apparatus;
determining a second frequency offset with respect to the reference frequency, the second frequency offset based on the first frequency offset and the received signal strength; and
transmitting a second channel signal having a frequency that is offset from the reference frequency by the second frequency offset;
wherein determining the received signal strength includes estimating an uplink received signal strength at the fixed radio apparatus for the second channel signal to be transmitted to the fixed radio apparatus from the first radio device.

9. The method of claim 8, wherein the first channel signal resides in a first sub-channel of a shared radio channel.

10. The method of claim 9, wherein the reference frequency is a center frequency of the shared radio channel.

11. The method of claim 10, wherein the shared radio channel is a 25 kilohertz wide frequency channel.

12. The method of claim 8, wherein the first channel signal is an uplink signal from the radio device and the second channel signal is a downlink signal to the radio device.

13. The method of claim 8, wherein determining the second frequency offset includes comparing a magnitude of the first frequency offset to a threshold, and if the first frequency offset is greater than the threshold, modifying a magnitude of the second frequency offset.

14. A mobile radio device, comprising:
a radio unit;
a processor; and
a memory comprising instructions executable by the processor for causing the mobile radio device to perform the method of claim 1.

15. A fixed radio apparatus, comprising:
a radio unit;
a processor; and
a memory comprising instructions executable by the processor for causing the fixed radio apparatus to perform the method of claim 8.

16. The method of claim 8, wherein estimating the uplink received signal strength includes measuring a downlink received signal strength of the transmitted signal from the fixed radio apparatus to the first radio device and modifying the downlink received signal strength to estimate the uplink received signal strength.

* * * * *